United States Patent [19]

Steffen et al.

[11] 4,445,626

[45] May 1, 1984

[54] METERING DEVICE FOR DISPENSING SELECTED AMOUNTS OF VISCOUS MATERIAL

[75] Inventors: Cliff Steffen, Bethel, Conn.; Nicholas P. Cappelli, Wappingers Falls, N.Y.

[73] Assignee: The Purdue Frederick Company, Norwalk, Conn.

[21] Appl. No.: 347,506

[22] Filed: Feb. 10, 1982

[51] Int. Cl.³ .............................................. B67D 5/32
[52] U.S. Cl. ...................................... 222/39; 222/47; 222/309; 222/386
[58] Field of Search ....................... 222/41, 43, 47, 48, 222/49, 50, 386, 309, 39; 604/207, 208, 210, 211, 218, 187; 401/53, 82, 171, 176, 177, 179

[56] References Cited

U.S. PATENT DOCUMENTS 939,198  11/1909  Allen ...................................... 222/47
2,653,746  12/1952  MacDonald .......................... 222/43

Primary Examiner—Joseph J. Rolla
Attorney, Agent, or Firm—Steinberg & Raskin

[57] ABSTRACT

A cylindrical container for viscous material has a first open base end of a first diameter and a spaced opposite closed base end with an opening therethrough of a second diameter smaller than the first diameter. A cylindrical plunger of a third diameter slightly smaller than the first diameter is coaxially slidably mounted in the container in a snug manner. The plunger has a closed plunger head perpendicular to its axis. A positioning device selectively positions the plunger and the container relative to each other at a plurality of different axial positions. The plunger, at each of the axial positions, forces a predetermined measured amount of the viscous material out of the opening of the container.

12 Claims, 5 Drawing Figures

FIG. 2
FIG. 3
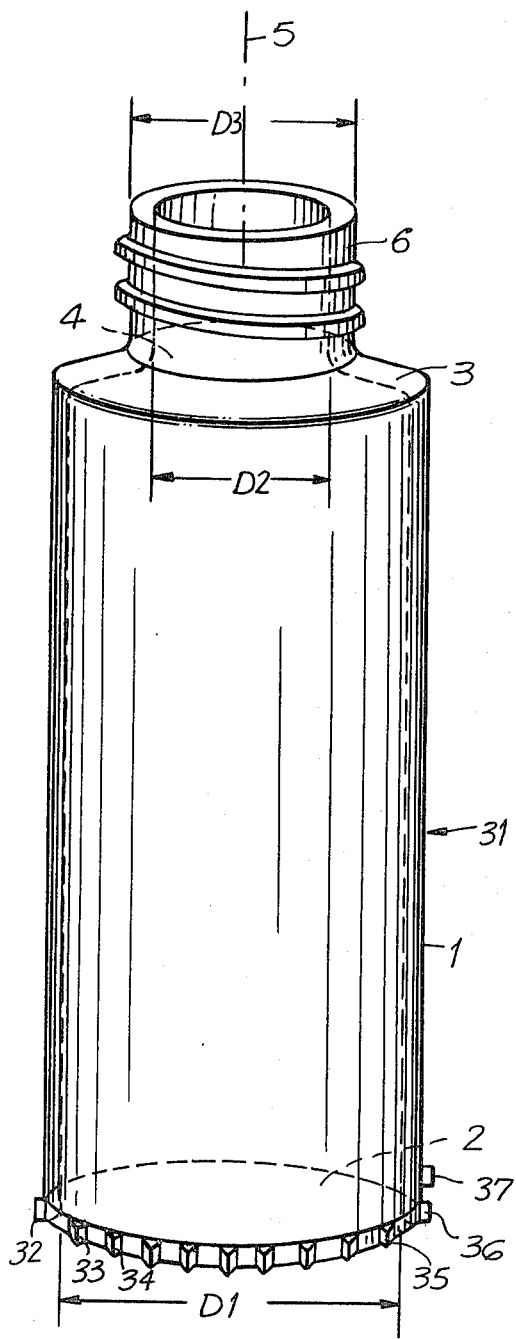
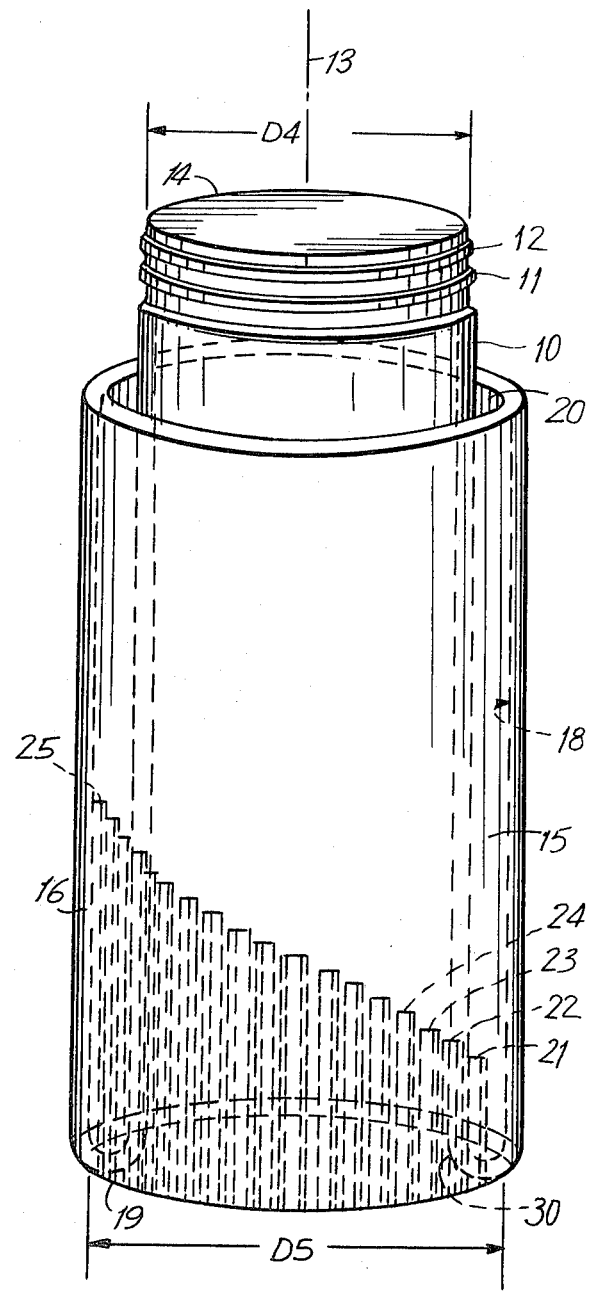

METERING DEVICE FOR DISPENSING SELECTED AMOUNTS OF VISCOUS MATERIAL

BACKGROUND OF THE INVENTION

The present invention relates to a metering device. More particularly, the invention relates to a metering device for dispensing selected amounts of viscous material such as, for example, paste, cream, amorphic preparations, or the like.

There are many different types of known devices for dispensing viscous material. Plastic or metal collapsible tubes are used for dispensing viscous materials such as, for example, toothpaste, shaving cream, or the like. This type of device is incapable of accurately metering or measuring the amount of material dispensed. A relatively inaccurate metering or measuring device is a calibrated sheet of paper, or the like. This device depends for its operation upon the user.

A hypodermic syringe is a highly accurate device for dispensing materials. However, the operator must be trained in order to use it with accuracy and its operation depends upon such operator. Although measuring containers such as, for example, spoons, cups, or the like, are reliable and accurate as measuring or metering devices, they must be cleaned after each use. Measuring caps are utilized to provide the dual functions of closing the container of the material and metering or measuring the amounts dispensed. The caps must be cleaned after each use and are difficult to clean, since there is usually a residue therein.

Unit dose containers such as, for example, packettes or unettes, are ideal devices for dispensing predetermined measurements of material and are variable, since they may be made to contain more than a single premeasured amount of material. These containers are sometimes difficult to open, depending upon the material dispensed. Flexible squeeze containers or bottles, utilized with a reservoir of material, or filled with the material, may be utilized, but they must be cleaned after use.

Aerosol containers are used to dispense viscous material. Valves have been developed which permit the aerosol containers to dispense a specified amount of material. However, the containers are of large size relative to the amount of material stored therein, so that they are clumsy to handle.

SUMMARY OF THE INVENTION

The principal object of the invention is to provide a metering device for dispensing selected amounts of viscous material with great accuracy.

An object of the invention is to provide a metering device for dispensing selected amounts of viscous material, which device is compact and of a size which makes it easy to handle and utilize.

Another object of the invention is to provide a metering device for dispensing selected amounts of viscous material, which device is easy to clean.

Still another object of the invention is to provide a metering device for dispensing selected amounts of viscous material, which device is used to vary the amount of material dispensed with great accuracy.

Yet another object of the invention is to provide a metering device for dispensing selected amounts of viscous material, which device is used with facility, convenience and without the need for instruction.

In accordance with the invention, a metering device for dispensing selected amounts of viscous material comprises a substantially cylindrical container for viscous material having a first open base end of a first diameter and a spaced opposite second closed base end with an opening therethrough of a second diameter smaller than the first diameter. A substantially cylindrical plunger of a third diameter slightly smaller than the first diameter is coaxially slidably mounted in the container in a substantially snug manner. The plunger has an axis and a closed plunger head substantially perpendicular to the axis. A positioning device selectively positions the plunger and the container relative to each other at a plurality of different axial positions. The plunger, at each of the axial positions, forces a predetermined measured amount of the viscous material out of the opening of the container. The container has an axis and a substantially cylindrical open neck extending coaxially from the opening of the second base end of the container and having a diameter considerably smaller than the first diameter.

A cap is removably coupled to and encloses the neck. The neck has external threading thereon and an internally threaded cap is removably coupled thereto.

The positioning device comprises a measuring member having an axis, a substantially cylindrical inner surface of a fourth diameter greater than the first diameter, a first open base end, a spaced opposite second open base end and a plurality of ribs extending laterally and radially from the inner surface substantially parallel to the axis, beginning at the first base end and having different lengths from the first base end.

The ribs are equiangularly spaced from each other on the inner surface and the lengths thereof are stepped relative to each other.

The lengths of next-adjacent ones of the ribs vary by a predetermined increment.

The container has a substantially cylindrical outer surface. The positioning device further comprises a lip portion extending substantially radially from the outer surface of the container and having a peripheral length less than twice the spacing between next-adjacent ones of the ribs whereby the lip portion abuts one of the ribs each time the container and the plunger are differently axially positioned relative to each other.

The lip portion extends adjacent the first base end of the container in a plane substantially perpendicular to the axis of the container.

The plunger has an open base end in spaced opposite relation with the plunger head and is joined at the open base end with the measuring member of the positioning device at the first base end of the measuring member.

The plunger and the measuring member of the positioning device are integrally formed.

The container has a substantially cylindrical outer surface and a plurality of substantially radial protrusions extending therefrom.

The protrusions are equiangularly spaced and produce sounds as they abut one of the ribs during relative rotation of the container and the plunger thereby providing an audible indication of a dispensed amount of viscous material.

BRIEF DESCRIPTION OF THE DRAWINGS

For a fuller understanding of the invention, reference is had to the following description, taken in connection with the accompanying drawings, in which:

FIG. 2 is a perspective view of the container of FIG. 1;

FIG. 3 is a perspective view of the plunger and positioning device of FIG. 1;

DESCRIPTION OF PREFERRED EMBODIMENTS

Figure 1:
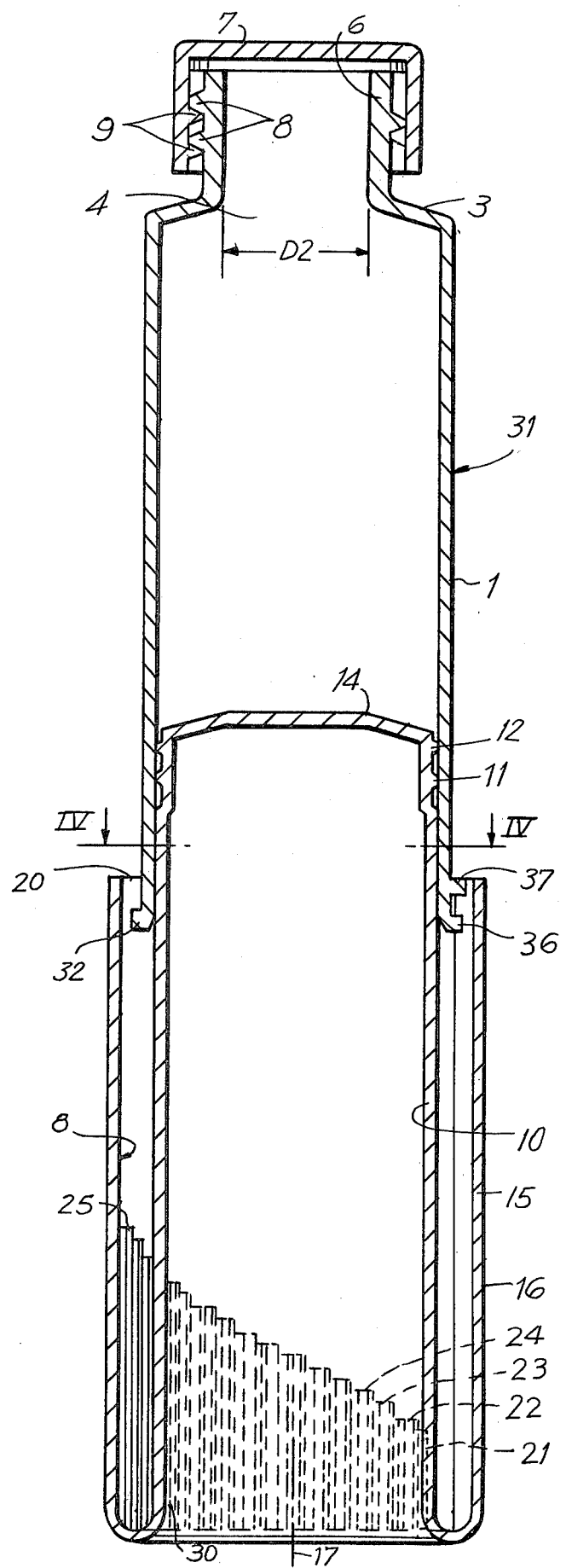
FIG. 1 is an axial sectional view of an embodiment of the metering device of the invention for dispensing selected amounts of viscous material.

The metering device of the invention for dispensing selected amounts of viscous material comprises a substantially cylindrical container 1 (FIGS. 1, 2 and 4) for viscous material such as, for example, paste, cream, amorphic preparations, or the like. The container 1 has a first open base end 2 (FIGS. 2 and 4) of a first diameter D1 (FIG. 2) and a spaced opposite second closed base end 3 (FIGS. 1 and 2) with an opening 4 therethrough (FIGS. 1 and 2). The opening 4 has a second diameter D2 (FIGS. 1 and 2) smaller than the first diameter D1.

The container 1 has an axis 5 (FIG. 2). A substantially cylindrical open neck 6 (FIGS. 1 and 2) extends coaxially from the opening 4 of the second base end 3 of the container 1 and has a diameter D3 (FIG. 2) considerably smaller than the first diameter D1.

As shown in FIG. 1, a cap 7 is removably coupled to, and closes, the neck 6. The neck 6 preferably has external threading 8 thereon and the cap 7 preferably has internal threading 9 therein (FIG. 1).

A substantially cylindrical plunger 10 (FIGS. 1 and 3) has a third diameter D4 (FIG. 3) slightly smaller than the first diameter D1. The plunger 10 is coaxially slidably mounted in the container 1 in a substantially snug manner, assured by rings 11 and 12 therearound (FIGS. 1 and 3). The plunger 10 has an axis 13 (FIG. 3) and a closed plunger head 14 (FIGS. 1 and 3) substantially perpendicular to said axis.

A positioning device 15 (FIGS. 1 and 3 to 5) selectively positions the plunger 10 and the container 1 relative to each other at a plurality of different axial positions. The plunger 10, at each of the axial positions, forces a predetermined measured amount of the viscous material out of the opening 4 of the container.

The positioning device 15 comprises a measuring member 16 (FIGS. 1, 3 and 4) having an axis 17 coincident with the axes 5 and 13. The measuring member 16 has a substantially cylindrical inner surface 18 (FIGS. 1 and 3 to 5) having a fourth diameter D5 (FIG. 3) greater than the first diameter D1, a first open base end 19 (FIG. 3) and a spaced opposite second open base end 20 (FIGS. 1 and 3). The measuring member 16 has a plurality of ribs 21, 22, 23, 24 (FIGS. 1 and 3) . . . 25 (FIGS. 1, 3 and 5) . . . 26, 27, 28 and 29 (FIGS. 4 and 5) extending laterally and radially from the inner surface 18 of said member, substantially parallel to the axis 17. The ribs 21 to 24 . . . 25 . . . 26 to 29 begin at the first base end 19 of the measuring member 16, have different lengths from said first base end and are equiangularly spaced from each other on the inner surface 18 of the measuring member 16. As shown in FIGS. 1, 3 and 5, the lengths of the ribs 21 to 24 . . . 25 . . . 26 to 29 are stepped relative to each other, the lengths of next-adjacent ones of said ribs varying by a predetermined increment.

In a measuring device of the invention constructed by the inventors thereof, there are preferably 42 stepped ribs 21 to 24 . . . 25 . . . 26 to 29 spaced in length by 0.046 inch. There is one full length rib 29 (FIGS. 4 and 5) and the ribs are spaced at 8° from each other.

The plunger 10 has an open base end 30 (FIGS. 1 and 3) in spaced opposite relation with the plunger head 14 and is joined at said open base end with the measuring member 16 of the positioning device 15 at the first base end 19 of said measuring member, as shown in FIGS. 1 and 3. The plunger 10 and the measuring member 16 of the positioning device 15 are preferably integrally formed in the aforedescribed manner, and as shown in FIGS. 1 and 3.

Figure 4:
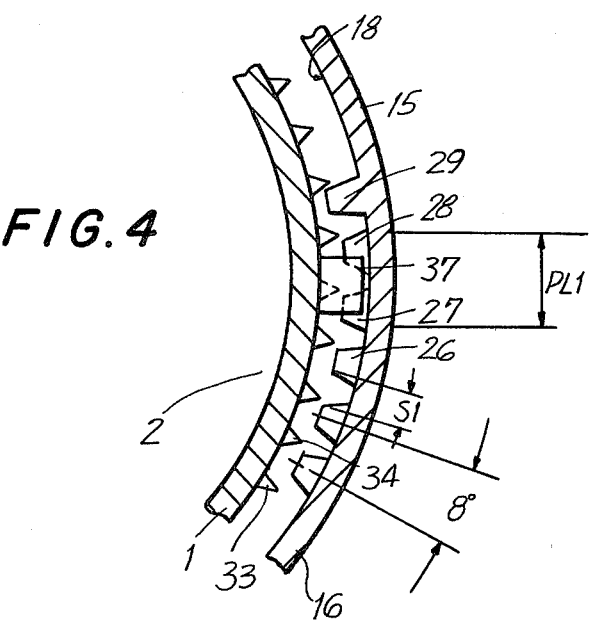
FIG. 4 is a cross-sectional view, on an enlarged scale, taken along the lines IV—IV, of FIG. 1.
Figure 5:
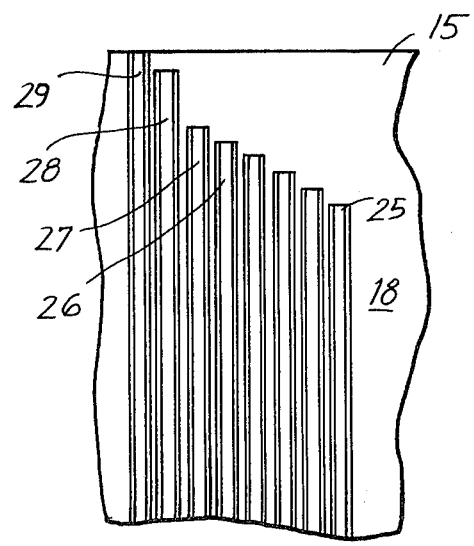
FIG. 5 is a view of part of the inner surface of the measuring member of the positioning device of FIG. 1, on an enlarged scale.

The container 1 has a substantially cylindrical outer surface 31 (FIGS. 1, 2 and 4). A plurality of substantially radial protrusions 32, 33, 34 . . . 35, 36, . . . (FIG. 2) extend from the outer surface 31 of the container 1. The protrusions 32, 33, 34 . . . 35, 36, . . . are equiangularly spaced and produce sounds as they abut the full length rib 29 during relative rotation of the container 1 and the plunger 10 thereby providing an audible indication of a dispensed amount of viscous material.

A lip portion 37 (FIGS. 1, 2 and 4) extends substantially radially from the outer surface 31 of the container 1 and has a peripheral length PL1 (FIG. 4) less than twice the spacing S1 (FIG. 4) between next-adjacent ones of the ribs 21 to 24 . . . 25 . . . 26 to 29. Thus, the lip portion 37 abuts one of the ribs 21 to 24 . . . 25 . . . 26 to 29 each time the container 1 and the plunger 10 are differently axially positioned relative to each other. The lip portion 37 extends adjacent the first base end 2 of the container 1 in a plane substantially perpendicular to the axis 5 of said container, as shown in FIGS. 1 and 2.

The stepped ribs 21 to 24 . . . 25 . . . 26 to 29 function to provide a stop for the lip portion 37 thereby limiting the relative axial movement of the container 1 and the plunger 10. The full length rib 29 has a length greater than the other 42 ribs. This causes interference with the protrusions 32 to 34 . . . 35, 36, . . . and produces the sounds hereinbefore mentioned. This also permits the container 1 to rotate in 8° increments relative to the plunger 10, since the rotation is temporarily impeded when the next-succeeding protrusion strikes the full length rib 29.

The metering device of the invention is used by securing the cap 7 to the neck 6 of the container 1, holding said container upside down, so that its open base end 2 is convenient, and pouring viscous material desired to be dispensed, into said container via said open base end. The plunger head 14 of the plunger 10 is then inserted into the open base end 2 of the container 1 and the lip portion 37 is placed in abutment with the rib 28, next-adjacent the full length rib 29. The metering device is then held upright and the cap 7 is removed.

The container 1 and the plunger 10 are then rotated relative to each other, so that said container moves clockwise relative to said plunger and said plunger moves counterclockwise relative to said container and the lip portion 37 moves from the end of the rib 28 to the end of the rib 27 for a single dose of viscous material, or is manually moved to the end of the rib 26, or any succeeding rib, diminishing in length. In this manner, selected desired amounts of the viscous material are dispensed through the neck 6 of the container 1.

The invention is by no means restricted to the aforementioned details which are described only as examples; they may vary within the framework of the invention, as defined in the following claims.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A metering device for dispensing selected amounts of viscous material, said device comprising
   a substantially cylindrical container for viscous material having a first open base end of a first diameter and a spaced opposite second closed base end with an opening therethrough of a second diameter smaller than said first diameter;
   a substantially cylindrical plunger of a third diameter slightly smaller than said first diameter and coaxially slidably mounted in said container in a substantially snug manner, said plunger having an axis and a closed plunger head substantially perpendicular to said plunger axis; and
   positioning means for selectively positioning said plunger and said container relative to each other at a plurality of different axial positions, said positioning means including a measuring member having an axis, a substantially cylindrical inner surface of a fourth diameter greater than said first diameter, a first base end, a spaced opposite second open base end and a plurality of ribs extending laterally and radially from said inner surface substantially parallel to said member axis, beginning at said first base end and having different lengths from said first base end, said plunger at each of said axial positions forcing a predetermined measured amount of said viscous material out of said opening of said container.

2. A metering device as claimed in claim 1, wherein said ribs are equiangularly spaced from each other on said inner surface and the lengths thereof are stepped relative to each other.

3. A metering device as claimed in claim 2, wherein the lengths of next-adjacent ones of said ribs vary by a predetermined increment.

4. A metering device as claimed in claim 2, wherein said container has a substantially cylindrical outer surface, and said positioning means further comprises a lip portion extending substantially radially from said outer surface of said container and having a peripheral length less than twice the spacing between next-adjacent ones of said ribs whereby said lip portion abuts one of said ribs each time said container and said plunger are differently axially positioned relative to each other.

5. A metering device as claimed in claim 4, wherein said lip portion extends adjacent said first base end of said container in a plane substantially perpendicular to said axis of said container.

6. A metering device as claimed in claim 1, wherein said container has an axis and further comprising a substantially cylindrical open neck extending coaxially from said opening of said second base end of said container and having a diameter considerably smaller than said first diameter.

7. A metering device as claimed in claim 6, further comprising a cap removably coupled to and closing said neck.

8. A metering device as claimed in claim 6, wherein said neck has external threading thereon, and further comprising an internally threaded cap removably coupled thereto.

9. A metering device as claimed in claim 1, wherein said plunger has an open base end in spaced opposite relation with said plunger head and is joined at said open base end with said measuring member of said positioning means at said first base end of said measuring member.

10. A metering device as claimed in claim 9, wherein said plunger and said measuring member of said positioning means are integrally formed.

11. A metering device as claimed in claim 1, wherein said container has a substantially cylindrical outer surface and a plurality of substantially radial protrusions extending therefrom.

12. A metering device as claimed in claim 9, wherein said protrusions are equiangularly spaced and produce sounds as they abut one of said ribs during relative rotation of said container and said plunger thereby providing an audible indication of a dispensed amount of viscous material.

* * * * *